United States Patent [19]
Backus et al.

[11] Patent Number: 5,221,962
[45] Date of Patent: Jun. 22, 1993

[54] SUBLIMINAL DEVICE HAVING MANUAL ADJUSTMENT OF PERCEPTION LEVEL OF SUBLIMINAL MESSAGES

[75] Inventors: Alan L. Backus; Ronald Popeil, both of Beverly Hills, Calif.; Casey Walsh, Medford, Oreg.; Jerry Lawson, Santa Clara, Calif.

[73] Assignee: Popeil Industries, Inc., Beverly Hills, Calif.

[21] Appl. No.: 567,376

[22] Filed: Aug. 14, 1990

Related U.S. Application Data

[63] Continuation-in-part of Ser. No. 252,667, Oct. 3, 1988, abandoned.

[51] Int. Cl.[5] ............................................. H04N 5/445
[52] U.S. Cl. .................................... 358/183; 434/236; 434/307
[58] Field of Search ............... 434/236, 262, 307, 319, 434/433; 358/183, 182, 22, 198

[56] References Cited

U.S. PATENT DOCUMENTS

| | | |
|---|---|---|
| 3,060,795 | 10/1962 | Corrigan et al. |
| 3,278,676 | 10/1966 | Becker |
| 3,585,991 | 6/1971 | Balamoth |
| 3,782,006 | 1/1974 | Symmes |
| 4,006,291 | 2/1977 | Imsand |
| 4,395,600 | 7/1983 | Lundy |
| 4,616,261 | 10/1986 | Crawford et al. |
| 4,692,118 | 9/1987 | Mould |
| 4,717,343 | 1/1988 | Densky |
| 4,734,037 | 3/1988 | McClure |
| 4,777,529 | 10/1988 | Schultz et al. |

Primary Examiner—James J. Groody
Assistant Examiner—Mark R. Powell
Attorney, Agent, or Firm—Keck, Mahin & Cate

[57] ABSTRACT

A method and apparatus for presenting subliminal visual and/or audio messages which allows user verification of message content and presence, as well as proper adjustment of message obviousness while accounting for ambient conditions and user sensitivities is disclosed. This method and apparatus also presents synchronized reinforced sensory input of subliminal messages. This is performed by simultaneously overlaying images received from a VCR over a plurality of television signals. This apparatus directs overlay images over RF television signals having both audio and video components.

15 Claims, 4 Drawing Sheets

SUBLIMINAL DEVICE HAVING MANUAL ADJUSTMENT OF PERCEPTION LEVEL OF SUBLIMINAL MESSAGES

This application is a continuation in part of co-pending application U.S. patent Ser. No. 252,667, Filed Oct. 3, 1988 and titled APPARATUS FOR GENERATING SUPERIMPOSED TELEVISION IMAGES, now abandoned.

FIELD OF INVENTION

The present invention relates to apparatus and methods of producing subliminal signals. More particularly, the present invention relates to apparatus and methods of causing visual and/or audio subliminal signals to be produced. More particularly still, the present invention relates to apparatus and methods causing the production of subliminal visual and/or audio signals which may influence an individual's behavior.

BACKGROUND OF THE INVENTION

Many apparatus are in the market place today which purport to influence individuals' behavior through use of signals presented below the level of the individual's conscious awareness. Among uses for these subliminal message presentation devices, they are well accepted as a form of selfhelp. Applications for such device include: loosing weight, stopping smoking, developing better study habits, etc.

Such devices are found in several forms. One of the most common of these forms is audio cassette tapes with music or natural sounds, such as waves or wind, masking verbal audio suggestions. Individuals play these tapes in their stereos or portable tape players, generally while working, resting or conducting other activities.

Another common form of subliminal device found in the market today is subliminal video cassette tapes. Such tapes generally show relaxing scenes; such as a beach at sunset or a pine forest in the mountains, while presenting sound tracks of music or natural sounds. Subliminal messages may be present in the visual and-or the audio portion of such tapes. These tapes require the individual to watch a television set to get the tapes' full benefits.

Many problems are presented by these subliminal devices. First, there is no way an individual may verify if any subliminal messages are being presented by such devices. By definition, the messages presented are at levels which are not readily detectable.

Continuing, there is no way an individual may positively verify what subliminal messages he or she is receiving. This is a major drawback because an individual must trust the manufacturer to place correct and positive subliminal messages on the tape. Some of these devices supply scripts and-or recordings of what they claim has been subliminally recorded. But there is no proof that these are accurate.

Next, there is no way an individual may adjust the level at which such subliminal messages are presented. These devices have their subliminal messages recorded at a fixed level of obviousness relative to their visual and/or audio masking signals. An individual has no means to alter this level.

Next, there is no way an individual may adjust the level of the subliminal signal to account for local environmental conditions. As an example, a subliminal audio tape being played in a quiet room may have its messages presented at an acceptable level of obviousness, but the same tape played in a noisy room may have its messages drowned out and reduced to a level which has no influence whatsoever, even on an individual's subconscious.

Next, there is no way an individual may adjust the level of the subliminal signal to account for the individual's own levels of perceptions and awareness. Some individuals are keenly aware of low level visual and/or audio signals while others take little or no notice of the same signals. But current devices have no means for an individual to adjust subliminal signals to account for their own sensitivities.

These devices also compel individuals to listen to and/or watch the same masking signals every time the device is used. A water fall scene or a passage of music may seem pleasing on its first playing, but after several repetitions, an individual may not wish to continue using the device.

OBJECTS AND ADVANTAGES

In view of the foregoing drawbacks and deficiencies of the prior art, it is an object of the present invention to present properly adjusted subliminal signals which may be masked by a variety of supraliminal signals.

Readers will find further objects and advantages of the present invention from a consideration of the ensuing description and the accompanying drawings.

SUMMARY OF INVENTION

The preset invention provides means for an individual to manually adjust, from supraliminal to subliminal levels, the level of obviousness of subliminal signals he or she is receiving. An embodiment using the present invention comprises: means to receive signals to be presented subliminally; means to mix such signals with supraliminally presented signals; and means that the individual receiving the subliminal signals may use to smoothly and infinitely adjust such subliminal signals' level of obviousness from supraliminal to subliminal.

The present invention allows individuals to verify the presence and content of subliminal signals they are receiving by providing the individuals with means to smoothly and infinitely adjust the signals from supraliminal to subliminal levels of obviousness.

The present invention allows individuals to smoothly adjust the obviousness of subliminal signals they are receiving to account for local environmental conditions and/or individual levels of perception and awareness.

The present invention eliminates the necessity to repetitiously review supraliminal masking signals by providing means to mix its subliminal signals with a variety of supraliminal masking signals.

DETAILED DESCRIPTION OF THE PREFERRED EMBODIMENT

Referring to FIGS. 2 through 5, the apparatus 20:
accepts input 25 from a source for one or more television signals such as a television cable or antenna 24
sends output 32 to a VCR 28 "RF in" jack 34
accepts input 36 from a VCR 28 "video out" jack 38
accepts input 40 from a VCR 28 "audio out" jack 42
accepts input 44 from a VCR 28 "RF out" jack 46
and sends output 48 to a television 50 antenna or cable input 54.

The apparatus 20 has two modes of operation, those of normal and subliminal operation. A switch 56, shown in FIG. 1, controls which mode the apparatus is in. An indicator D3 58 proximate to the switch 56 glows when the apparatus 20 is in subliminal operating mode.

Figure 1:
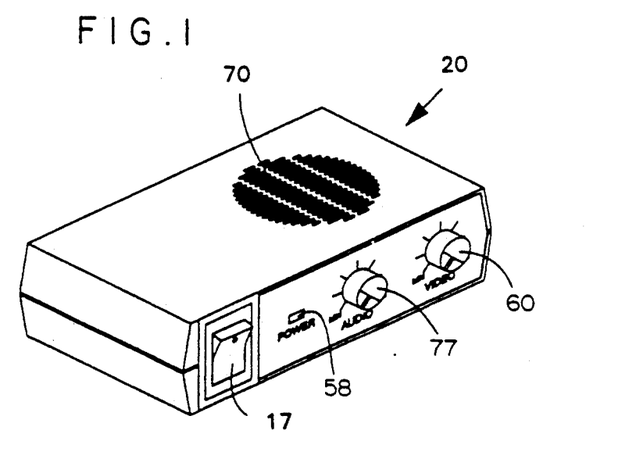
FIG. 1 is a perspective front view of a device built in accordance with the present invention.

In normal mode, the television 50 and VCR 28 operate as if the apparatus was not present. That is, a tape placed in the VCR will play or record in conventional fashion, and the television 50 will display the VCR output or tuned television signals as if the apparatus 20 was not present.

In subliminal mode, the apparatus selectively altars portions of all television signals emanating from the television cable or antenna 24 and going to the television 50. The particular alterations in the circuit specified cause an intermittent partial or complete attenuation of all television signals emanating from the television cable or antenna 24. Other alterations are also feasible such as intermittently: amplifying, phase shifting, etc., the television signals. These alterations of the television signals cause subliminal messages to appear on the video monitor coexistent with the video signals appearing during normal operation.

Figure 4:
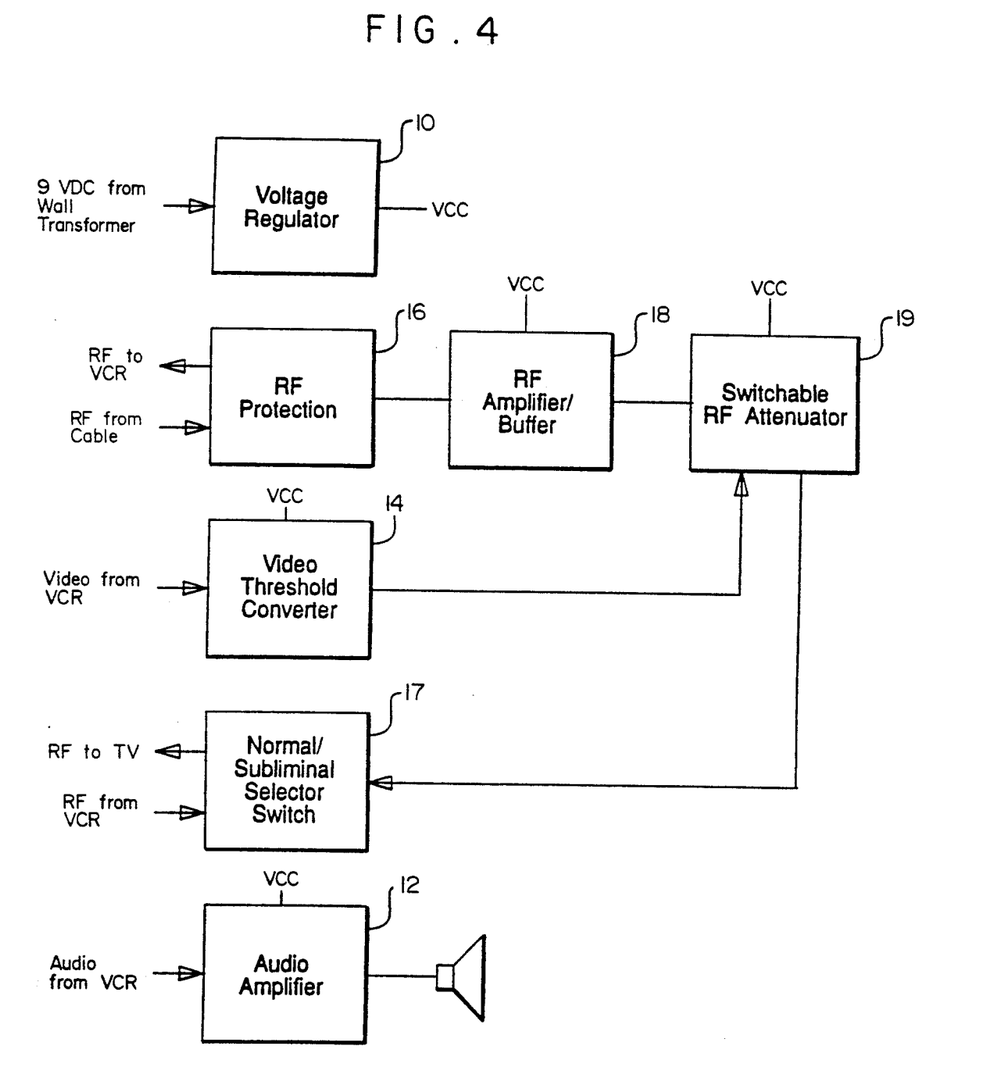
FIG. 4 is a block diagram of apparatus built in accordance with the present invention.

Referring to FIG. 4, a device constructed in accordance with one embodiment of the present invention comprises seven components, including a voltage regulator 10, an audio amplifier 12, a video threshold convertor 14, RF protection 16, an RF amplifier/buffer 18, a switchable RF attenuator 19, and a normal/subliminal selector switch 17. The voltage regulator 10 receives a 9 volt DC input from a standard plug-in wall transformer which output which provides an input voltage to the RF amplifier/buffer 18, the switchable RF attenuator 19, the video threshold converter 14 and the audio amplifier 12. The RF protection circuit 16 receives an RF signal from a cable or antenna. If the apparatus is in the non-operational mode, the RF signal is passed directly as an RF input to the VCR. If the apparatus is in the operational mode, the RF signal from the cable or antenna is passed through the circuit in order of RF protection circuit 16, the RF amplifier/buffer 18, the switchable RF attenuator 19, the normal/subliminal selector switch 17 and to the RF input of a television. The video threshold convertor 14 receives a video output signal from a VCR and generates an output signal to the switchable RF attenuator 19. The normal/subliminal selector switch 17 receives an RF signal from a VCR. As suggested by the designation "normal/subliminal" the output signal from the VCR may be a subliminal visual and/or audio signal such as a self help message that does not produce a conscious sensation or perception in the viewer. If the apparatus is in the non-operational state, normal mode, the RF signal to the television is the output from the switchable RF attenuator 19. The audio amplifier 12 receives an audio signal from a VCR and generates an audio output.

Figure 5:
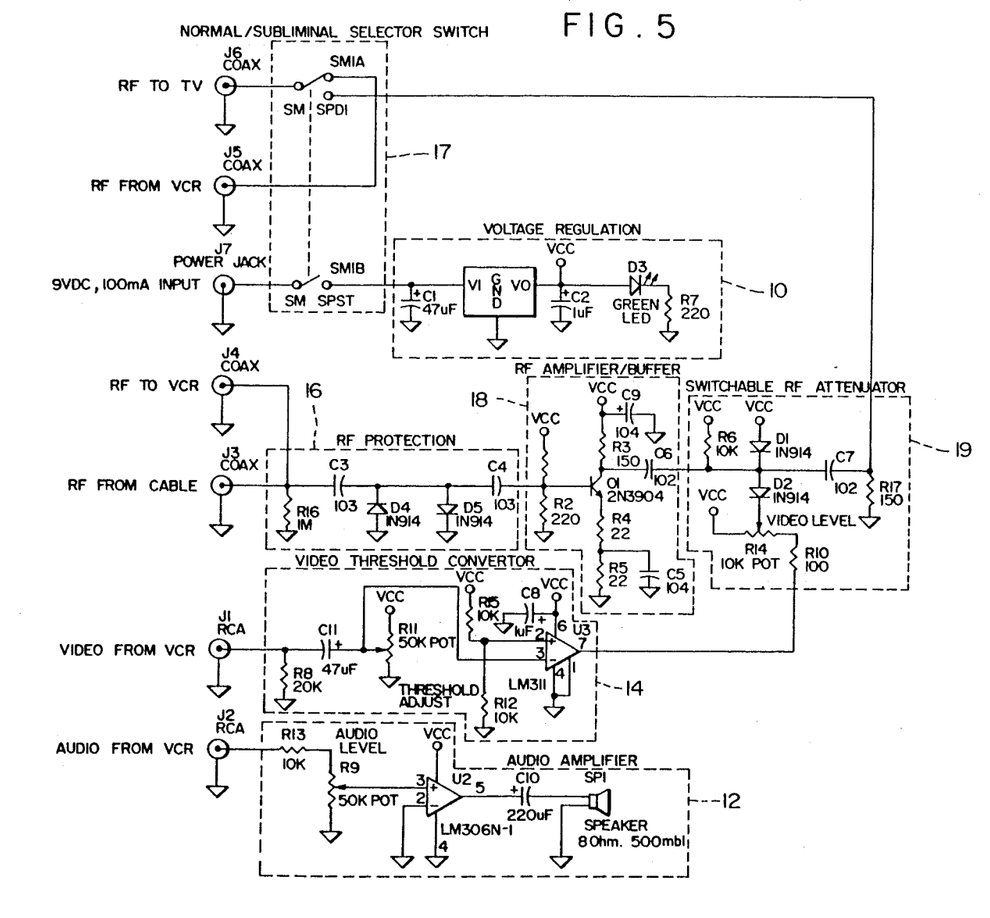
FIG. 5 is a circuit diagram of apparatus built in accordance with the present invention.

Referring to FIG. 5, the voltage regulator 10 of FIG. 4 is represented in principal part by the capacitors C1 and C2, the resistor R7, the LED D3 and the integrated circuit U1. The input to the voltage regulator 10 is a 9 volt DC 100 milliamp signal from a standard plug-in wall transformer connected to the power jack J7. The capacitor C1 is used to filter the rectified DC voltage presented at power jack J7. The integrated circuit U1 is a standard linear integrated circuit implemented to regulate the unstable DC voltage presented by C1 to a definable 6 volts DC. The capacitor C2 is used to assist U1 by acting as an energy storage device, thus providing energy when an instantaneous high current event takes place. The LED D3 is used as a visual annunciator to signify that the device is both powered up and operating in the composite image generating mode. The resistor R7 is used to regulate the current through (and thus the brightness of) the LED D3. The voltage regulator output is represented by VCC and is a stable six volt DC signal.

Figure 2:
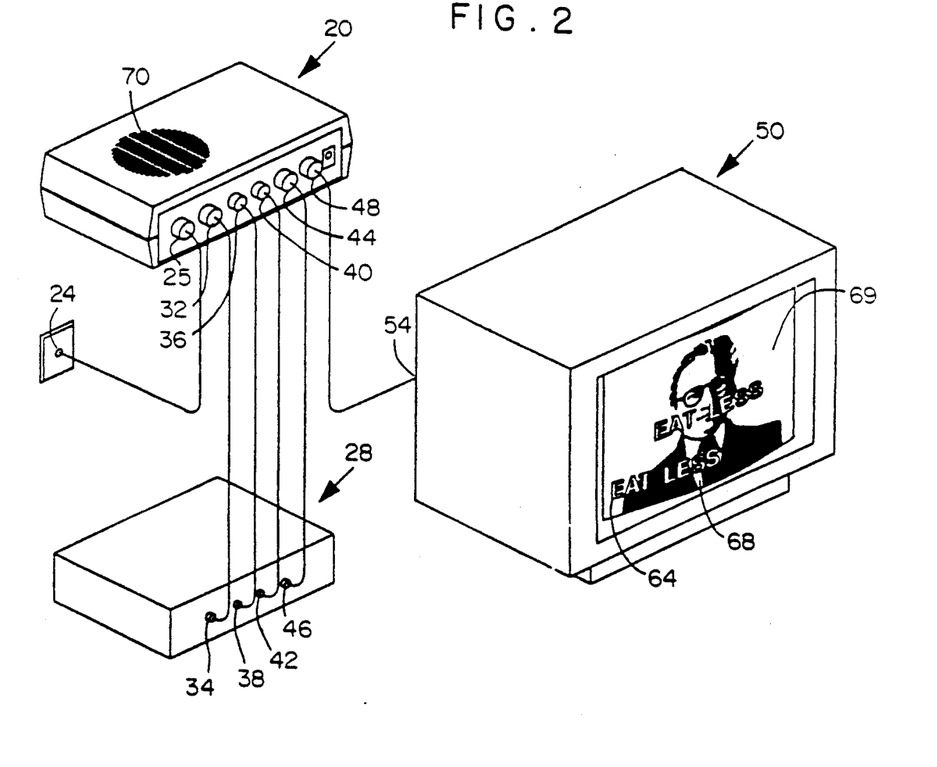
FIG. 2 is a perspective view of apparatus utilizing the present invention showing interconnections. It is to be noted that the apparatus 20 is not shown in proportion to scale.

The optional audio amplifier 12 of FIG. 4 is represented in principal part by the resistor R13, the variable resistor R9, the capacitor C10, the integrated circuit U2 and the speaker SP1. The input to the audio amplifier is an audio output signal from a VCR or the like. The resistor R13 is used to limit the AC voltage presented to the audio amplifier U2. This limits the maximum volume setting to a level within the specifications of U2. The variable resistor R9 is used to control the AC voltage presented to the audio amplifier U2. This is the audio message volume control which smoothly or infinitely controls the volume of the audio message. The integrated circuit U2 is implemented as an audio amplifier. In the present embodiment, U2 is a low voltage audio power amplifier available from National Semiconductor Corporation, bearing the designation LM386. The LM386 is an eight pin power amplifier for use in low voltage applications. In the present application, pins 2, 3, 4, 5, and 6 are utilized as shown in FIG. 2 such that U2 provides a maximum usable power output of 250 milliwatts at 8 ohms.

Video signals from the VCR are received by the jack J1 and delivered to the video threshold convertor 14. Intermittent alterations occur as determined by these video signals emanating from the video out jack 38 on the VCR 28. These signals enter the apparatus through a jack J1, 36 of FIG. 2, and are thresholded by the video thresholding circuit 14 which strips the video signals of their synchronization pulses and thresholds them into binary on/off signals. As the name video thresholding circuit implies, both processes of normal and subliminal operation are accomplished simultaneously by creating an "on" signal when the incoming video signal is above a predetermined threshold level, and by creating an "off" signal at all other times.

The video threshold convertor is represented in principal part by the capacitors C8 and C11, the resistors R8, R12 and R15, the variable resistor R11 and the integrated circuit U3. The input to the video threshold convertor is a video signal from a VCR or the like provided at the jack J1. The resistor R8 provides DC termination of the composite video signal presented at J1. The capacitor C11 is used to AC couple the standard video signal presented at J1 with the signal required by the voltage comparator U3. That is, the capacitor C11 removes the DC component from the J1 video signal. The variable resistor R11 is used to set the DC bias point of the negative input of the voltage comparator U3. This variable resistor may be replaced by two fixed resistors once an optimum setting (ratio) is determined. The resistors R12 and R15 are used to set the DC bias point of the positive input of the voltage comparator U3. The capacitor C8 is used as an energy storage device providing the voltage comparator U3 with the instantaneous current required during switching. This capacitor should be located as near to the voltage comparator U3 as is physically possible. The integrated circuit U3 is an 8 pin voltage comparator whose internal output transistor switches on in the event that the DC level-shifted composite video signal presented to its negative input becomes greater than the static DC voltage presented to its positive input. In the present embodiment, U3 is a voltage comparator available from National Semiconductor Corporation, bearing the designation LM311. As shown in FIG. 2, pins 1, 2, 3, 4, 7, and 8 are employed. The output of U3 is provided at pin 7. As hereinafter discussed, this output is adjusted to eliminate the standard television synchronization pulses from the VCR video signal as well as low luminance background noise. The video threshold converter output at pin 7 of the comparator U3 provides an RF attenuation signal to the switchable RF attenuator.

The thresholded binary on/off signals are then sent to a switchable RF attenuator 19 which attenuates the RF television signal(s) passing from the television cable or antenna 24 to the television 50 when an "on" signal is received from the video threshold circuit. The apparatus' circuit is configured so that when the video signal from jack 38 enters jack J1 36 of the video threshold convertor 14 the signal carries a section of a video image which is white or near white when displayed on a television or video monitor, an "on" signal representing the video signal is above the threshold level is sent to the switchable RF attenuator 19.

The switchable RF attenuator 19 is represented in principal part by the capacitor C7, the resistors R6, R10 and R17, the variable resistor R14 and the diodes D1 and D2. The resistor R6 is used to cause the RF signal(s) presented by the RF amplifier/buffer to center around the regulated 6 volt power signal. The diodes D1 and D2 are used to reduce the effective AC resistance of this signal path by an adjustable amount. Reducing the AC resistance causes a determinable RF attenuation.

The RF television signal(s) passing from the television cable or antenna 24 is inputted into the device through a jack J3, 25 to FIG. 2, which connects to the switchable RF attenuator 19 through an RF protection circuit 16 and an RF amplifier-buffer 18. The RF protection circuit is represented in principal part by the capacitors C3 and C4, the resistor R16 and the diodes D4 and D5. The resistor R16 is used to drain any possible parasitic DC voltage build-up that may occur on standard RF signal sources, such as an antenna. The capacitor C3 is used to AC couple the standard RF signal presented to J3. The diodes D4 and D5 are used to limit the voltage presented by C3 to a 1 volt swing. This will act as overload protection to the circuits involved with the standard RF signal presented to J3. In the present embodiment, the diodes D4 and D5 are high conductance ultra fast switching diodes available from Fairchild, a Schlumberger Company, bearing the designation 1N914. The capacitor C4 is used to AC couple the signal presented by the RF protection circuit to the signal required by the RF amplifier/buffer.

The RF amplifier/buffer is represented in principal part by the capacitors C5, C6 and C9, the resistors R1, R2, R3, R4 and R5 and the transistor Q1. The resistors R1, R2, R3, R4 and R5 are used to DC bias the transistor Q1 to act as a gain stabilized DC amplifier. In the present embodiment, Q1 is an overlay, double-diffused, gold-doped, silicon epitaxial NPN device available from National Semiconductor Company, bearing the designation 2N3904. The capacitor C5 is used to reduce the effective AC emitter resistance. The resistor C9 is used as an energy storage device providing the RF amplifier/buffer with greater power supply noise immunity. This capacitor should be placed as near to the transistor Q1 as is physically possible. The capacitor C6 is used to AC couple the signal presented by the RF amplifier/buffer to the signal required by the switchable RF attenuator. The signal is then attenuated when the switchable RF attenuator 20 receives an "on" signal from the video threshold converter 14. After this selective attenuation, the RF television signal(s) are sent through a jack J6, 48 of FIG. 2, to the cable or antenna input 54 of a television 50.

The switchable RF attenuator 19 has a video level control R14, represented as a variable resistor, which controls the amount of attenuation the RF television signal(s) passing from the television cable or antenna 24 to the television 50 receive when an "on" signal is sent to the switchable RF attenuator 19. This video level control R14 is able to be manually adjusted to smoothly or infinitely control attenuation of the RF television signal(s) from low or no attenuation to high or full attenuation. A pluarality of these televisions signals are capable of being attenuated simultaneously.

The variable resistor R14 is used to determine the effective AC resistance presented by D1 and D2 when the switchable RF attenuator is actively attenuating. This is the video message intensity control 60. The resistor R10 is used to limit the amount of attenuation attainable with the switchable RF attenuator. This prevents high current switching activity which could otherwise result in undesirable RF emissions. The capacitor C7 is used to AC couple the signal presented by the switchable RF attenuator 19 to the signal required by the RF receiver connected to the jack J6. The resistor R17 is used in conjunction with R3 of the RF amplifier/buffer to balance the RF signal presented to J3, by providing an effective AC resistance of 75 ohms as presented by this device.

The normal/subliminal selector switch is represented in principal part by the switch SW1. When SW1 is in the off state, no power is provided from J7 to the voltage regulator and an RF signal from a VCR or the like is provided from the jack J5 to the jack J6 to provide an RF input to a television or the like. When the switch SW1 is in the on position, power is provided from the jack J7 to the voltage regulator and the jack J6 is disconnected from the jack J5 and connected to the output of the switchable RF attenuator.

The portions of the television signal(s) which have been attenuated on an NTSC standard television system show up as lightened picture areas 64 on the television image 68 tuned by the television 50.

Because all RF television signal(s) inputted into the television 50 have been selectively attenuated in response to a video signal emanating from the VCR 28 which is scanning at the same frequency as the RF television signal(s) (30 frames per second in the case of NTSC standard), the selective attenuation creates light picture areas 64 which resemble the thresholded video signal emanating from the VCR 28. Thus in 1/30 of a second the VCR 28 transmits through output 38 a single video frame 64 of 525 rasher lines (using NTSC as an example), which contains an overlay image. A television signal carried by the television cable or antenna also carries a single 525 rasterline video frame every 1/30 of a second. This synchronization means one full VCR video frame occurs and overlays one television cable or antenna video frame every 1/30 of a second.

These overlaid images are not, however, necessarily in register or alignment with either the television screen 69 or the television images 68 displayed on it. This is because the television frames 64 being transmitted by the VCR 28 do not necessarily start at the same time as the television frames 68 emanating from the television cable or antenna 24 which are being displayed on the television 50, and because the apparatus 20 has no means for rectifying video image start times (i.e. no synchronization pulse detection means, and no means to control timing of the display of either the VCR 64 or cable or antenna 68 video images).

Because all television signals passing through the apparatus 20 are intermittently attenuated, any channel tuned by the television 50 will have an image overlay 64 resembling the thresholded video output 38 of the VCR 28.

It is to be noted that all signals passing from the television cable or antenna 24 to the television 50 are attenuated including signals carrying both audio and video programming. There is, however, little or no effect on the audio portions of such signals because the duration of attenuation is extremely short (generally less than 1/50,000 of a second).

The apparatus 20 also receives input through a jack J2, 40 of FIG. 2, from the "audio out" jack 42 on the VCR 28. This signal is sent through an audio amplifier 12 to a speaker SP1. A control, represented by a variable resistor R9, permits smooth manual control of audio volume outputted by the speaker SP1 from silent or near silent output levels to obviously perceived output levels.

The sound emanating from the speaker SP1 is mixed in open air with other ambient sounds including sounds which may be emanating from the television 50.

It is important to note that all sounds emanating from the speaker SP1 are inherently synchronized with the images 64 superimposed over television programming. This is because both simultaneously originate from the same prerecorded VCR tape 76. Thus once a video tape 76 has been recorded, every sound recorded on its audio track corresponds with an image recorded on its video track and vice versa.

The frames are not in exact aligment, the subliminal images may be off-centered from the television screen. he apparatus 20 may compensate for its inability to register or align its subliminal images 64 with the television screen 69 by redundantly overlaying the same image many times. As an example, the words "STOP SMOKING" may appear subliminally in four screen locations for a single video frame. Seven video frames later the same words may appear subliminally in five other screen locations. This may be repeated for long durations. Thus alignment of the images is not required for combining of the two signals to be displayed.

As this exemplifies, repetition may be in the form of many identical messages being presented at once, and-/or many identical messages being repeatedly presented sequentially. Such repetition compensates for any information lost to the inability to register or align frames.

Figure 3:
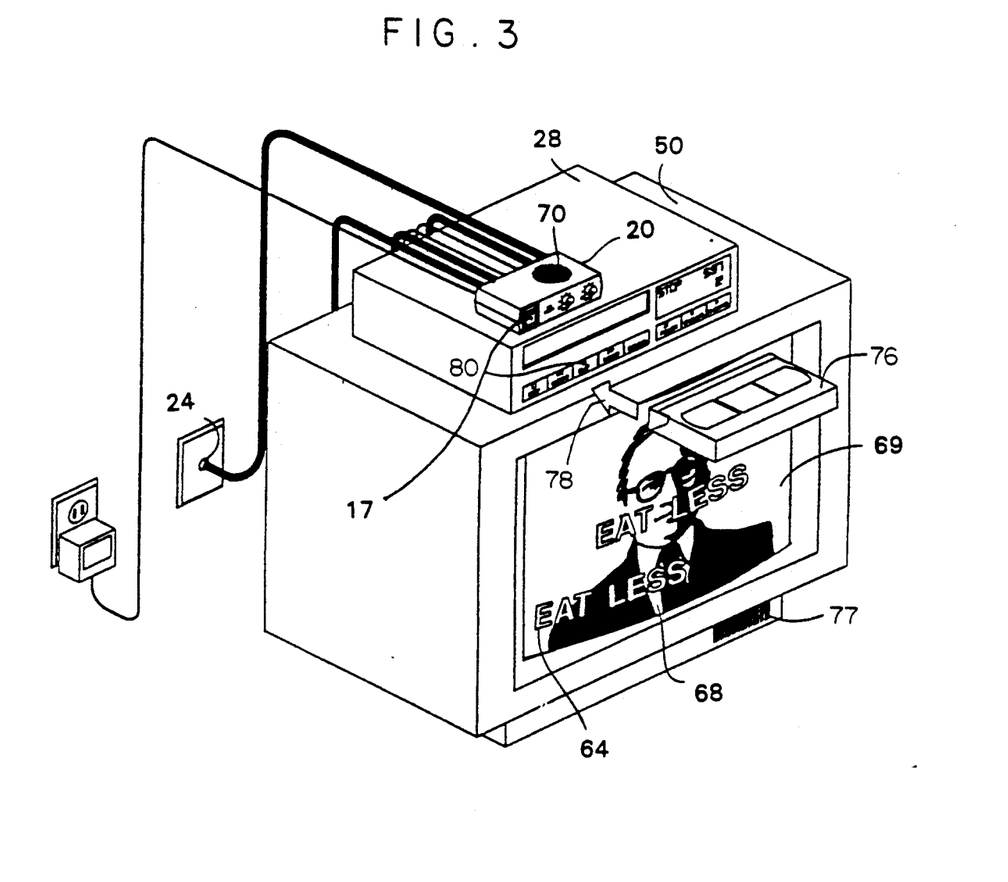
FIG. 3 is a perspective view of an exemplary setup utilizing the present invention.

The apparatus 20 is placed where its user or users may reach its controls 60 77 and manually control the audio video signals. FIG. 3 shows an example of a possible installation. Here the apparatus 20 is placed on the VCR 28 by means of Velcro (tm) hook and loop fasteners (not shown) adhered to the VCR 28 and bottom of the apparatus 20.

When a user wishes to use the television 50 and/or VCR 28 without image and/or sound overlays, he or she simply turns the normal/subliminal switch 17 on the apparatus 20 to the normal or "off" position.

When visual and/or sound subliminal messages are desired, the switch 17 is turned to its subliminal or "on" position.

The apparatus 20 may then be used for transmitting audio and/or visual subliminal messages. As an example, visual and/or audio subliminal messages may be overlaid on television programming received by the television cable or antenna 24.

To accomplish this, as is shown in FIG. 3, a VCR tape 76 containing the visual and/or audio messages, to be presented subliminally, would be loaded 78 into the VCR 28. The apparatus' normal/subliminal switch 17 would be placed in the subliminal position, and the VCR 28 would be put in play mode 80.

The user would then turn on and tune the television 50 and adjust 60 77 the apparatus 20. To adjust 60 visual images overlaid by the apparatus 20, the user would first turn the apparatus' 20 video control 60 to its fullest attenuation setting creating white or very light overlay images 62 64. At this setting, messages 64 presented even for durations as short as one video frame would generally be clearly seen and read. Slow motion or freeze framing the VCR 28 would help in seeing and/or in reading such messages.

The user would then gradually turn the video control 60 thus reducing the amount of attenuation and the obviousness of the overlaid images 64 until the images 64 gradually became just imperceptible, and thus subliminal. The user thus watches the overlaid image 64 gradually fade to subliminal levels.

By following this procedure, a user may assure himself or herself that visual subliminal messages are present and what their content is. This procedure also insures that the overlaid images 64 are subliminal to the apparatus' user or users regardless of ambient conditions and user sensitivities, because the user himself or herself adjusts the subliminal level under actual use conditions.

A similar procedure is used in adjusting the audio signals emanating from the speaker 70 and mixing in open air with ambient sound including possible sounds 82 from the television 50.

The apparatus' 20 audio control 77 is adjusted to a level where sounds emanating from the speaker 70 may be clearly heard. The control 77 is then slowly turned down just until such sounds may no longer be heard. This has the same benefits of the apparatus' user being insured of the presence of subliminal messages, knowing the contents of such messages, and being able to adjust such subliminal messages' presentation levels accurately while accounting for ambient conditions and user sensitivities.

It is to be noted that the apparatus 20 may produce audio and video 64 subliminal messages independently of one another. Thus a visual supraliminal or subliminal signal may be presented by the apparatus 20 over a television image without the apparatus introducing audio signals. This may be accomplished either by not recording an audio track on the VCR tape 76 or by adjusting the apparatus' audio control 77 below effective subliminal levels. The reverse is also true that the apparatus 20 may produce supraliminal or subliminal audio signals without introducing visual signals.

The apparatus also need not have the television 50 on in order to generate audio subliminal messages.

The apparatus 20 can overlay both its visual 64 and/or its audio subliminal messages over any viewed channel, even while channels are being changed. Adjustment 60 77 of the apparatus is necessary only when there is a substantial change in signal strength, ambient conditions, or type or programming viewed (i.e. programming with loud sound tracks versus more quiet programming or programming with light scenes versus dark scenes).

The apparatus' 20 inherent synchronization between its visual and audio subliminal messages allows creation of subliminal programming which uses sensory reinforcement to create a more powerful effect. The principal behind this is the same as with supraliminal programming where, as an example, modern motion pictures use coordinated sounds and images to create more powerful and believable impressions than just having sounds or images alone.

As an example of such coordinated subliminal programming, a visual subliminal image might contain the words "STOP SMOKING", while the accompanying subliminal soundtrack might simultaneously say "stop smoking".

Another example might be subliminally showing an image of an unhappy face with a cigarette in its mouth while simultaneously presenting subliminal coughing sounds.

Yet another example would be subliminally showing several sequential visual frames which animate to show a face coughing a cigarette out of its mouth while synchronizing the animation with coughing sounds presented subliminally.

The apparatus 20 has the ability to create visual subliminal images using presentations of short duration and/or by fading the obviousness of the images. Images as short as one field (1/60 of a second using NTSC standard) may be created by recording an interlaced image with every other raster line missing onto the VCR tape 76.

Any recorded VCR image, even moving or animated images or images presented for long durations, may be presented subliminally using the apparatus 20 simply by adjusting the video control 60 as indicated above until the image fades below conscious visibility.

The apparatus 20 allows the presentation of audio and/or video subliminal messages while its user(s) is viewing a television program. Research has shown that watching television may create a relaxed, suggestible state similar to that found in hypnosis. Presenting subliminal messages in this environment may be more effective than presenting such messages in other environments.

The apparatus 20 is also unique in its ability to overlay images over a plurality of RF television signals without demodulating their RF carriers.

The apparatus 20 may also overlay images over non-RF video signals as well as over combinations of both RF and non-RF video signals carried by the same medium.

Uses for embodiments of the present invention include introducing subliminal messages to individuals, as well as introducing subliminal messages to groups of individuals.

As an example, a television set could be set up in a public area and an embodiment of the present invention could be used to introduce subliminal messages through it. Under such conditions audio and video adjustments would be used to compensate for ambient conditions and would not take account of individual sensitivities.

Such a setup could be used in schools to foster better study habits or reduce drug usage, or in shopping malls or stores to reduce shoplifting, etc.

Virtually any audio or visual messages may be subliminally presented by embodiments of the present invention. This includes alone or in combination: still and/or animated visual communications; momentary and/or prolonged messages; positive and/or negative messages; written words and/or graphic images; spoken words and/or other sounds; audio and visual messages having the cadence of brain wave patterns such as alpha and theta brain wave patterns; audio messages using music; messages with synchronized audio and visual components; etc.

Examples of subliminal messages using graphics, animation and sounds other than spoken words are given earlier. Theories behind changing behavior through subliminal communications, as well as systems of messages thought to be effective in subliminally changing behavior, are well known to those knowledgeable in the art and thus are not discussed here.

What have been described are certain aspects of a device to present subliminal information. It is understood that the foregoing description and accompanying illustrations are merely exemplary and are in no way intended to limit the scope of the invention, which is defined solely by the appended claims and their equivalents. Various changes and modifications to the preferred embodiments will be apparent to those skilled in the art. Such changes and modifications may include, but are not limited to: selectively altering an RF signal in ways other than attenuation in order to create an image such as selectively amplifying or wave phase shifting the RF signal; using sources of video signals other than a VCR such as a video disk player or other visual source means; using a display device other than a conventional television such as a liquid crystal or plasma display; using the apparatus for image combining other than subliminal images such as for video games, computer overlays, displaying channel time or other information etc.; using a source other than a television cable or antenna to provide the supraliminal masking television image such as a video game or computer image or another VCR or a base band television image such as produced out of a second VCR "video out" jack (note that the device may overlay images over television images carried as base band, non-RF signals, as well as over those carried as RF signals); implementing image synchronization means in the apparatus such as a 15 khz receiver which could receive the television picture tube's RF vertical sync pulse radiations and store and present its overlay images in register with them; using control means other than knob controlled potentiometers to smoothly control visual or audio overlay signals, such as IR remote controls or other electronic controls; wiring the apparatus between the television cable or antenna and the television in ways other than indicated such as wiring the cable or antenna 24 to the VCR "RF in" connector 34 and connecting the VCR "RF out" connector 46 to the apparatus 20 "RF in" connector 25, then connecting the apparatus' two center RF connectors 32 40 and connecting the rest of the wires as indicated; etc.

Such changes and modifications can be made without departing from the spirit and scope of the invention. Accordingly it is intended that all such changes and modifications be covered by the appended claims and equivalents.

We claim:

1. Apparatus for presenting reinforced sensory subliminal messages, comprising:
   means for receiving a first visual signal and a first audio signal from a stored source, with said first visual and said first audio signals being in synchronization with each other,
   means for adjusting said first visual signal to a subliminal level,
   means for adjusting said first audio signal to a subliminal level,
   means for receiving a second visual signal,
   means for combining said first visual signal with said second visual signal such that said first visual signal is subliminal and said second visual signal is supraliminal,
   means for delivering said combined first and second visual signals to a display means,
   means for outputting said first audio signal.

2. The apparatus of claim 1, further comprising a source means for storing a first visual signal and a first audio signal in synchronization with each other, and said means for receiving is coupled to and receives from the source means the synchronized said first visual signal and said first audio signal.

3. The apparatus of claim 2, wherein said source means is a player of recorded video media.

4. The apparatus of claim 1, further comprising a stored first visual signal and audio signal in synchronization stored in said source means, said first video signal and said first audio signal both carrying behavorial modification messages.

5. The apparatus of claim 4, wherein said behavorial modification messages are self-help messages.

6. Apparatus comprising:
   means for receiving a first visual signal containing self help messages,
   means for receiving a second visual signal,
   means for combining said first and said second visual signal,
   visual presentation means for visually presenting a visual signal,
   means for delivering said combined first and second visual signals to said visual presentation means,
   control means, controllable by the viewer of said combined first and second visual signals, for infinitely adjusting said first visual signal containing said self help messages from being clearly visible on the visual presentation means to subliminal on the visual presentation means, for adjusting for user sensitivities, and verifying the presence of, visual subliminal signals.

7. The apparatus of claim 6, wherein said second visual signal is a television signal.

8. Apparatus of claim 7, further comprising:
   means for receiving an audio signal carrying self help messages,
   means for outputting said audio signal,
   second control means, controllable by the listener of said self help messages, for infinitely adjusting said audio signal from a level of said self help messages being clearly audible to a level of said self help messages being subliminal, for adjusting to user sensitivities, and verifying the presence of audio subliminal messages.

9. The apparatus of claim 8 further comprising recorded media means containing said self help messages and said means for receiving said audio signal being coupled to said recorded media means to receive said audio signal therefrom.

10. The apparatus of claim 9 wherein said recorded media means also contains said first visual signals in the form of television signals.

11. A apparatus for presenting subliminal self help messages, comprising:
    a housing,
    first receiver means for receiving one or more television signals from a source for one or more television signals, said first receiver means including first connection means mounted on the housing for connecting with a source of one or more television signals and first circuit means mounted in said housing coupled to said first connection means for receiving the television signals from the first connection means,
    second receiver means for receiving a video signal containing self help messages from a source of a video signal containing self help messages, said second receiver means including second connection means mounted on the housing for connecting with a video signal containing self help messages, and second circuit means mounted on the housing coupled to said second connection means for receiving the video signal from said second connection means,
    combining means mounted on said housing for combining said video signal containing self help messages with said one or more television signals,
    means mounted on the housing for outputting said combined video and television signals to a television display means for presentation to a viewer,
    control means manually controllable by the viewer mounted on the housing for controlling said video signal containing self help messages to a subliminal level as presented on the television display means.

12. The combination of an apparatus as claimed in claim 11, further comprising a video tape recorder containing recorded video media coupled thereto wherein the recorded video media constitutes the source of the video signal containing self help messages.

13. A method for presenting reinforced sensory subliminal messages, comprising the steps of:
    receiving a first visual signal and a first audio signal from a stored source, with said first visual and said first audio signals being in synchronization with each other,
    adjusting said first visual signal to a subliminal level,
    adjusting said first audio signal to a subliminal level,
    receiving a second visual signal,
    combining said first visual signal with said second visual signal such that said first visual signal is subliminal and said second visual signal is supraliminal,
    delivering said combined first and second visual signals to a display means,
    outputting said first audio signal.

14. A method for adjusting for user sensitivities, and verifying the presence of, visual subliminal signals, comprising the steps of:
- receiving a first visual signal containing self help messages,
- receiving a second visual signal,
- combining said first and said second visual signal,
- delivering said combined first and second visual signals to a visual presentation device,
- adjusting said first visual signal containing said self help messages from being clearly visible on the visual presentation device to subliminal on the visual presentation device.

15. The method of claim 14, further comprising the steps of:
- receiving an audio signal carrying self help messages,
- outputting said audio signal,
- adjusting said audio signal from a level of said self help messages being clearly audible to a level of said self help messages being subliminal for adjusting to user sensitivities, and verifying the presence of audio subliminal messages.

* * * * *